UNITED STATES PATENT OFFICE.

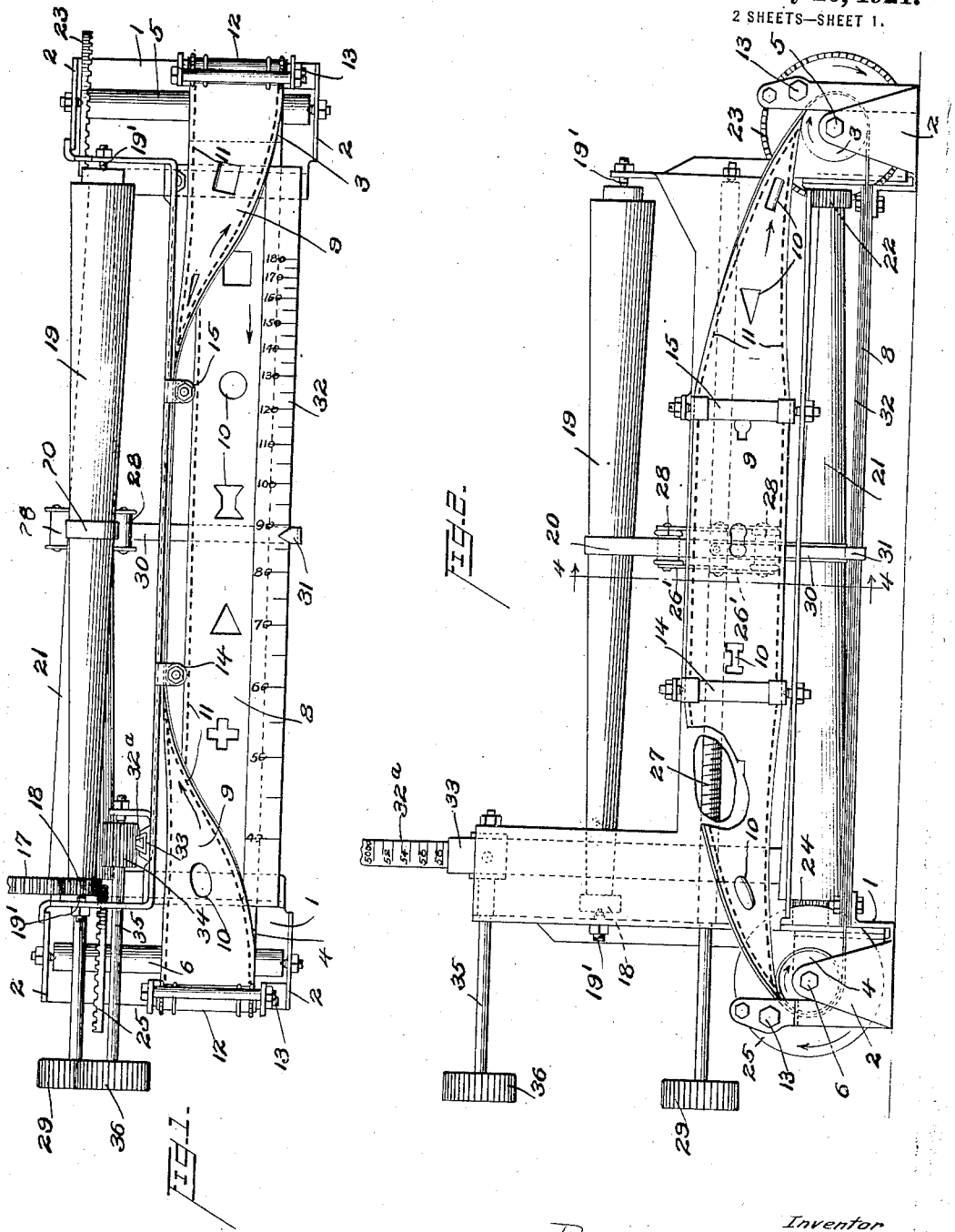

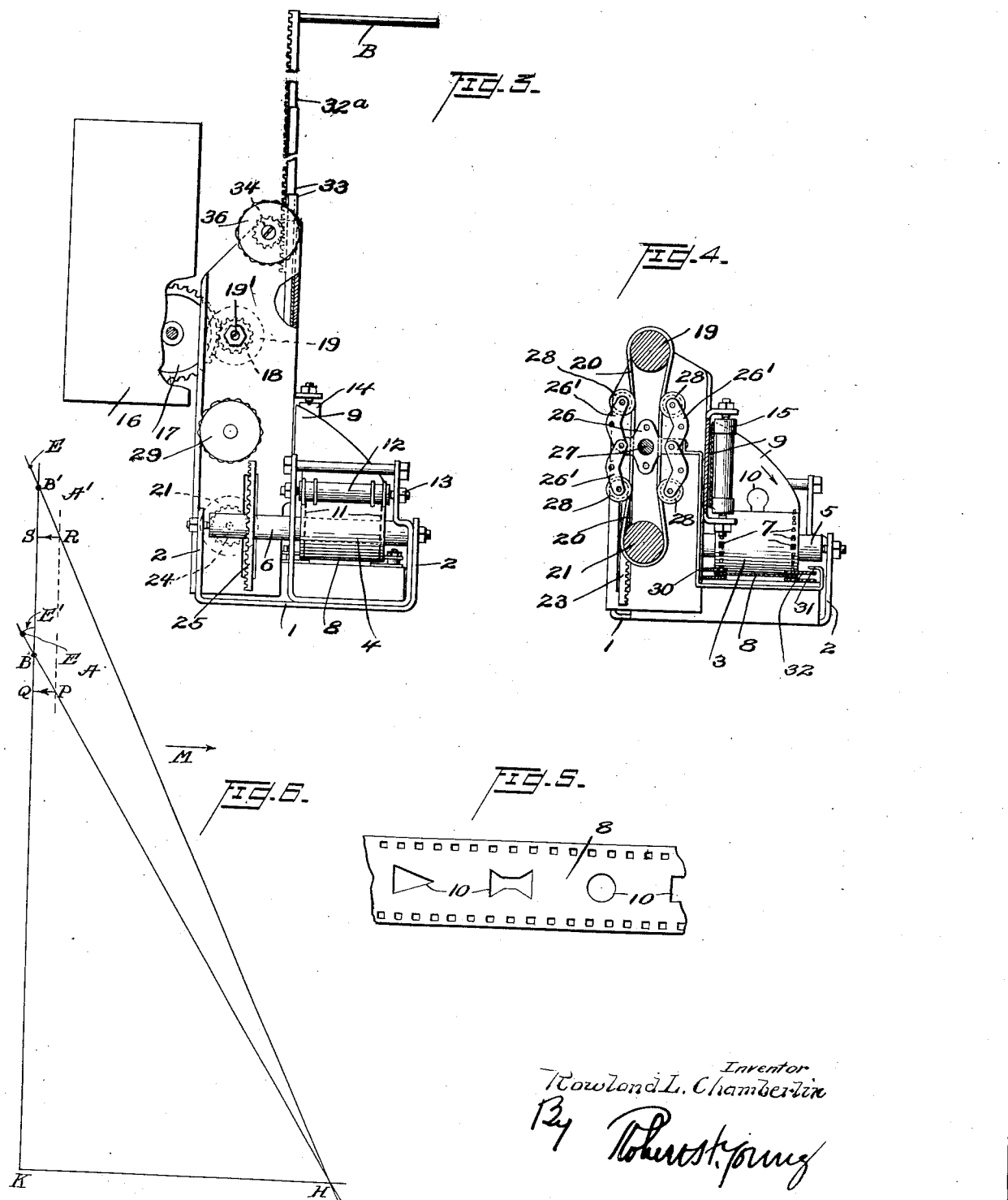

ROWLAND L. CHAMBERLAIN, OF AUBURN, CALIFORNIA.

GROUND-SPEED METER FOR AIRCRAFT.

1,385,776.      Specification of Letters Patent.    Patented July 26, 1921.

Application filed August 23, 1919. Serial No. 319,462.

*To all whom it may concern:*

Be it known that I, ROWLAND L. CHAMBERLAIN, a citizen of the United States, residing at Auburn, in the county of Placer and State of California, have invented certain new and useful Improvements in Ground-Speed Meters for Aircraft, of which the following is a specification.

This invention relates to a ground speed meter for aircraft, that is to say, a device for indicating the speed of the aircraft with relation to the ground.

The object of the invention is to provide a device by which the actual speed of the aircraft with relation to the ground may be read, regardless of whether or not the airplane is flying in head winds or cross winds.

The invention comprises essentially a movable film in the shape of an endless belt, provided with a series of sighting marks, which belt is driven by a variable speed device. Associated with the film, which is preferably made transparent, is a sighting rod or sighting bead which coöperates with the sighting marks on the film and certain objectives on the ground in a manner as will appear hereinafter.

The stretch of film through which the sighting takes place is arranged substantially horizontally and is driven in a direction opposite to that of the travel of the aircraft.

The device operates on the following principle: When the pilot looks through the film he sees the sighting marks on the film moving at a certain rate and he also sees objectives on the ground, such as houses, churches, trees, etc., moving, or apparently moving, at a certain rate, depending upon the speed of the airplane, in the same direction as the sighting marks on the film move.

By adjusting the speed of the film, the pilot can cause the sighting marks on the film to appear to move at the same speed as the objectives on the ground. It is apparent that the faster the airplane is going, the faster must be the speed of the film in order to have the sighting marks and the ground objectives move at the same rate, or in other words, the speed of the airplane is a function of the speed of the film for any given altitude of the aircraft.

It is also apparent that adjustment must be made for altitude, inasmuch as the higher the aircraft, the slower the speed of the film in order to have the sighting marks and ground objectives move at the same rate. This altitude adjustment will be described later.

It should be understood that there is used a continuous series of sighting marks on the film and a continuous series of objectives on the ground.

Other objects and advantages will appear as the description proceeds.

In the drawings illustrating one embodiment of my invention,

Figure 1 is a plan view of my ground speed meter.

Fig. 2 is a side view of the same.

Fig. 3 is an end view.

Fig. 4 is a section on the line 4—4 of Fig. 2.

Fig. 5 is a view of a part of the film, and

Fig. 6 is a diagrammatic view illustrating the principle of operation of my device.

The principle of operation of the device as shown in Fig. 6 will first be taken up. In this figure H K indicates a certain distance on the ground, say one mile. P Q indicates a certain length of film which subtends the distance H K on the ground. B is a sighting point. E represents the eye of the pilot. The parts just described are supposed to be at altitude A. The section of film P Q is being driven toward Q, as indicated by the arrow. The aircraft is supposed to be moving in the direction of the arrow M.

The pilot now adjusts the speed of the film until it takes the same time for an object to apparently move from the point H to the point K as it takes a sighting mark on the film to move from the point P to the point Q. At the given altitude A, with the sighting rod B in the position shown, it is apparent that it is simply a matter of calibration of the speed of the film P Q to have it read the actual speed of the aircraft with relation to the ground.

While the operator is making his observations, he sights across the sighting rod B and his eye describes a small arc E' as he follows the points P and H.

Now, if the aircraft is at some other height, such as A', it is obvious that some adjustment must be made so that the same stretch of film will measure the same distance on the ground. The section of film R S is drawn equal to the section P Q. In order to make the compensation just mentioned, it is apparent that the sighting rod must be moved somewhat higher, such as to the position indicated at B'. This raising and lowering of the sighting rod B is accomplished manually by the pilot in a manner to be described later. The pilot reads the altitude of the aircraft on his altimeter and sets the sighting rod B accordingly.

Referring now to Figs. 1 and 2, the ground speed meter comprises a framework 1, provided at opposite ends with pairs of standards 2 in which are respectively mounted a pair of driving rollers 3 and 4 on axes 5 and 6 respectively. These rollers may be provided with teeth 7 to engage in suitable perforations in the film.

The film is in the form of an endless belt, the lower stretch of which is indicated at 8 and the upper stretch of which is indicated at 9. This film is preferably transparent and carries a series of sighting marks 10 of any desired character. The film is provided with perforations 11 that engage over the teeth 7 of the driving rollers. The film engages over the driving rollers 3 and 4 and is driven thereby. Guide rollers 12, mounted on axes 13, may be used to hold the film in place on the driving rollers.

The film is driven in the direction of the arrows by a variable speed mechanism that will be described later. The lower stretch of film 8 is driven in a direction opposite to the direction of travel of the aircraft and is the section of film that is used when making observations. This section of film is substantially horizontal. In order to get the upper stretch of film 9 out of the way, it is threaded under a pair of vertical guide rollers 14 and 15 which hold it back out of the way.

The means for driving the film will now be described. 16 indicates a clock-work of any desired character which will drive the gear 17 at a substantially constant speed. The details of this clock-work form no part of this invention and are not described in detail. This driven gear 17 meshes with a gear 18, which is rigid with the conical drive pulley 19 rotatably mounted in the bearings 20 in the framework 1 of the device.

The pulley 19, by means of a belt 20, drives another conical pulley 21, reversely arranged with respect to the pulley 19. It is evident that by moving the belt along the pulley 19, a variable speed drive is obtained. The pulley 21 is mounted in suitable bearings and is provided with a gear wheel 22, which meshes with the gear wheel 23 mounted on the axis 5 with the driving roller 3. The other end of the pulley 21 may be provided with another gear wheel 24, meshing with a gear wheel 25 mounted on the axis 6 to drive the other driving roller 4.

The means for moving the belt 20 back and forth comprises a carrier 26 which is internally threaded to engage with the longitudinally extending threaded shaft 27 rotatably mounted in the standards 2 of the device. Carrier 26 is provided with a series of arms 26', which in turn carry a series of flanged rollers 28 that engage with the belt 20.

Shaft 27 is provided with a hand-operating knob 29.

To briefly summarize the operation of the parts, the clockwork drives the upper pulley 19 to drive the belt 20, cone pulley 21, gears 22, 23, 24 and 25, to drive the drive rollers 3 and 4. Rotating the knob 29 moves the carrier 26 back and forth to move the belt 20 back and forth, to drive the cone pulley 21 at various speeds.

The operator manipulates the knob 29 until a speed is obtained such that the series of sighting marks 10 traveling along the stretch of film 8 appear to be moving at the same rate as objectives on the ground.

The position, therefore, of the carrier 26 is a measure of the speed of the airship. The carrier, therefore, is provided with an arm 30 which carries a pointer 31 moving over a suitably calibrated scale 32, calibrated in miles per hour.

The sighting rod or sighting point designated B in Fig. 6, is indicated at B in Fig. 3, and is carried on the vertically disposed toothed rack $32^a$ slidably mounted in the guide-way 33. The rack $32^a$ engages with a gear 34 which is mounted on the shaft 35 on which in turn is mounted the thumb-screw 36, the turning of which moves the sighting bar B up and down to compensate for changes in altitude. The rack $32^a$, as indicated in Fig. 2, is calibrated in altitude. Before making a reading, the pilot reads the altitude on his altimeter and sets the rack $32^a$ accordingly. When this adjustment is made, knob 29 is manipulated until the apparent speed of the objects 10 on the film is the same as the apparent speed of objectives on the ground seen through the film, the operator while making his observations looking across the sighting rod B and lining this sighting rod up with the objects 10 on the film and the objectives on the ground, his eye while making his observations moving through the small arc E', as shown in Fig. 6. The principle of operation is perhaps more clearly suggested if, in Fig. 6, the airplane is considered as fixed, and if the ground is considered as moving from the right to the left and the ray of light from an objective on the ground as pivoting about the sighting rod B.

While I have illustrated one embodiment of my invention, it should be understood that it may be carried out in many other ways and that the disclosure be construed accordingly.

I claim as my invention:

1. A ground speed meter comprising a continuously driven horizontal member provided with sighting marks, and a sighting device vertically adjustable with respect to said element and designed to coöperate with said sighting marks.

2. A ground speed meter for an airship, comprising a continuously driven element provided with sighting marks, and a sighting device positioned above said continuously driven element and vertically adjustable to compensate for changes in altitude of the airship.

3. A ground speed meter for an airship, comprising a continuously driven element provided with sighting marks, a sighting device, designed to coöperate with said sighting marks, driving means to drive said element, a speed changing device interposed between said driving means and said driven element, a calibrated scale, and indicating means, associated with said speed changing device and with said scale.

4. A ground speed meter for an airship, comprising a continuously driven element provided with sighting marks, a sighting device, vertically adjustable to compensate for changes in altitude of the airship, designed to coöperate with said sighting marks, driving means to drive said element, and a speed changing device interposed between said driving means and said driven element.

5. A ground speed meter for an airship, comprising a continuously driven element provided with sighting marks, a sighting device, vertically adjustable to compensate for changes in altitude of the airship, designed to coöperate with said sighting marks, driving means to drive said element, a speed changing device interposed between said driving means and said driven element, a calibrated scale, and indicating means, associated with said speed changing device and with said scale.

In testimony whereof I affix my signature.

ROWLAND L. CHAMBERLAIN.